(12) United States Patent
Inoue

(10) Patent No.: US 11,906,024 B2
(45) Date of Patent: Feb. 20, 2024

(54) VEHICLE DRIVE DEVICE

(71) Applicant: AISIN CORPORATION, Aichi (JP)

(72) Inventor: Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/012,169

(22) PCT Filed: Sep. 24, 2021

(86) PCT No.: PCT/JP2021/034991
§ 371 (c)(1),
(2) Date: Dec. 21, 2022

(87) PCT Pub. No.: WO2022/065411
PCT Pub. Date: Mar. 31, 2022

(65) Prior Publication Data
US 2023/0258250 A1 Aug. 17, 2023

(30) Foreign Application Priority Data
Sep. 25, 2020 (JP) .................................. 2020-161130

(51) Int. Cl.
*B60K 1/00* (2006.01)
*F16H 57/02* (2012.01)
(Continued)

(52) U.S. Cl.
CPC ........... *F16H 37/0813* (2013.01); *B60K 1/00* (2013.01); *B60K 17/165* (2013.01); *B60K 25/06* (2013.01);
(Continued)

(58) Field of Classification Search
CPC ............... F16H 37/0813; F16H 57/037; F16H 57/0424; F16H 57/0436; F16H 57/0457;
(Continued)

(56) References Cited

U.S. PATENT DOCUMENTS

2009/0127954 A1* 5/2009 Mogi .................. F16H 57/0476
310/90
2011/0050014 A1* 3/2011 Mogi .................. F16H 57/0476
310/83
(Continued)

FOREIGN PATENT DOCUMENTS

JP 2019-129608 A 8/2019

*Primary Examiner* — Tisha D Lewis
(74) *Attorney, Agent, or Firm* — Oliff PLC

(57) ABSTRACT

A vehicle drive device includes: a rotating electrical machine that functions as a driving force source for wheels; an input member drivingly connected to rotating electrical machine; a pair of output members each drivingly connected to wheel; a differential gear mechanism that distributes rotation transmitted from rotating electrical machine to pair of output members; a transmission gear mechanism that drivingly connects input member and differential gear mechanism; a hydraulic pump that includes a pump rotor and chamber housing the pump rotor and that supplies oil to at least the rotating electrical machine; and a case. The case includes a partition portion that separates in an axial direction a first housing chamber housing rotating electrical machine and a second housing chamber housing transmission gear mechanism and differential gear mechanism). Pump chamber is formed in partition wall so as to be located between first and second housing chambers in the axial direction.

8 Claims, 4 Drawing Sheets

(51) Int. Cl.
  *F16H 37/08* (2006.01)
  *B60K 17/16* (2006.01)
  *B60K 25/06* (2006.01)
  *F16H 57/037* (2012.01)
  *F16H 57/04* (2010.01)

(52) U.S. Cl.
  CPC ....... *F16H 57/037* (2013.01); *F16H 57/0424* (2013.01); *F16H 57/0436* (2013.01); *F16H 57/0457* (2013.01); *F16H 57/0471* (2013.01); *F16H 57/0476* (2013.01); *F16H 57/0483* (2013.01); *B60K 2001/001* (2013.01); *B60Y 2200/91* (2013.01); *B60Y 2400/87* (2013.01); *F16H 2057/02034* (2013.01); *F16H 2057/02052* (2013.01)

(58) Field of Classification Search
  CPC ............. F16H 57/0471; F16H 57/0476; F16H 57/0483; F16H 2057/02034; F16H 2057/02052; B60K 1/00; B60K 17/165; B60K 25/06; B60K 2001/001; B60Y 2200/91; B60Y 2400/87
  See application file for complete search history.

(56) References Cited

U.S. PATENT DOCUMENTS

2012/0080248 A1\* 4/2012 Kasuya ................... H02K 9/19
  903/902
2019/0229582 A1 7/2019 Ito et al.

\* cited by examiner

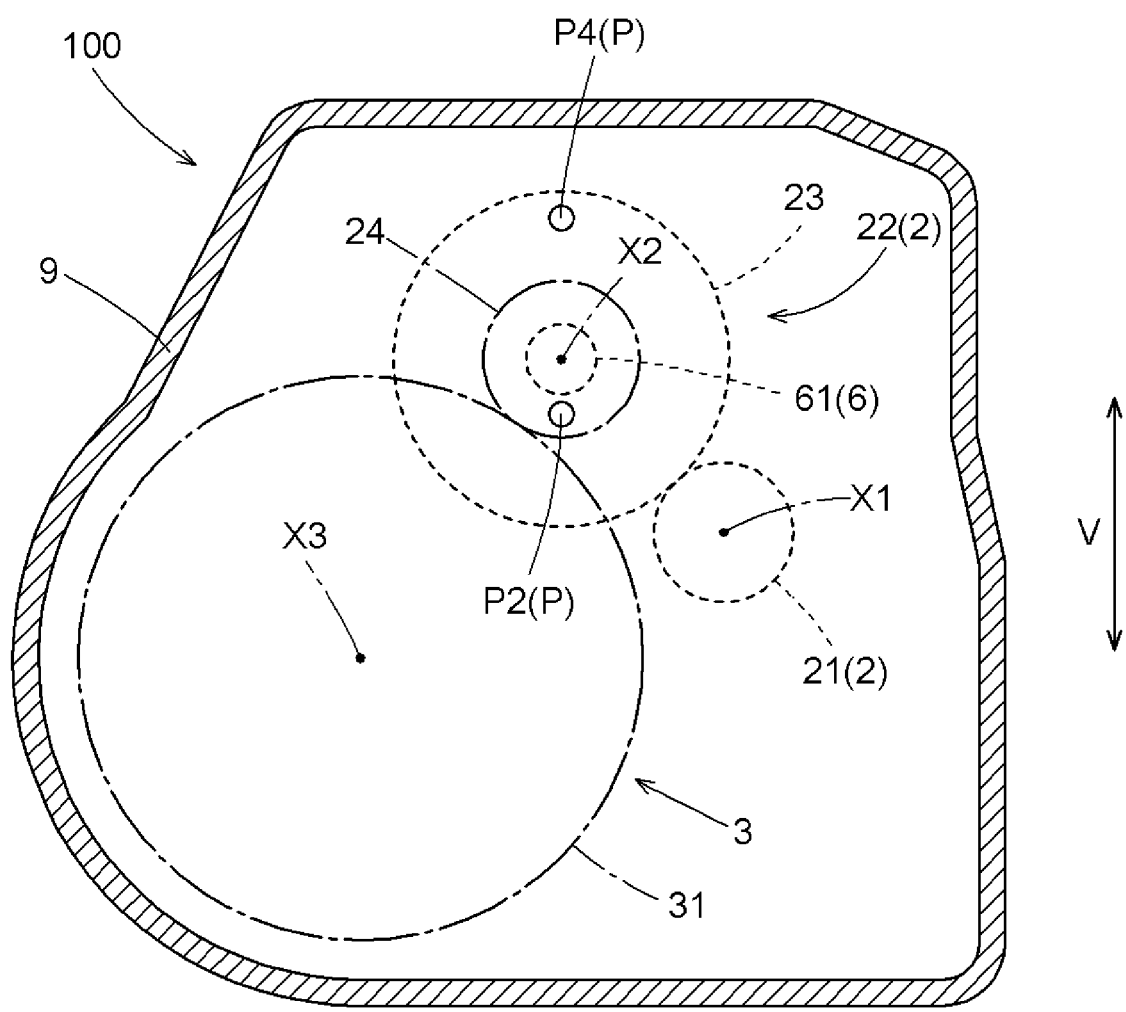

VEHICLE DRIVE DEVICE

TECHNICAL FIELD

The present disclosure relates to vehicle drive devices including: a rotating electrical machine that functions as a driving force source for wheels; an input member drivingly connected to the rotating electrical machine; a pair of output members each drivingly connected to the wheel; a differential gear mechanism that distributes rotation transmitted from the rotating electrical machine to the pair of output members; and a hydraulic pump that supplies oil to at least the rotating electrical machine.

BACKGROUND ART

An example of such a vehicle drive device is disclosed in Patent Document 1 below. In the description of "BACKGROUND ART" and "Problem to be Solved by the Invention," signs used in Patent Document 1 are shown in parentheses.

In a vehicle drive device of Patent Document 1, a counter gear mechanism (22) is provided in a power transmission path between an input member (22a) drivingly connected to a rotating electrical machine (12) and a differential gear mechanism (24). A pump input shaft (50) of a hydraulic pump (40) is connected to a counter shaft (22e) of the counter gear mechanism (22) so as to rotate with the counter shaft (22e). Therefore, the hydraulic pump (40) is driven with rotation of the counter gear mechanism (22).

RELATED ART DOCUMENTS

Patent Documents

Patent Document 1: Japanese Unexamined Patent Application Publication No. 2019-129608 (JP 2019-129608 A)

SUMMARY OF THE DISCLOSURE

Problem to be Solved by the Invention

In the vehicle drive device of Patent Document 1, the hydraulic pump (40) is disposed outside a case (18) that houses the rotating electrical machine (12) etc. Specifically, a pump cover (48) is joined to the outer surface of a side wall portion (36a) of the case (18). A pump chamber (S3) that houses pump rotors (40a, 40b) is formed between the side wall portion (36a) and the pump cover (48).

In this configuration, the hydraulic pump (40) is provided with a sealing member and a relief valve (56) in order to prevent oil from leaking from the pump chamber (S3) to the outside of the case (18). The sealing member is a member that seals between the side wall portion (36a) and the pump cover (48) in an oil-tight manner (see FIG. 2 of Patent Document 1). The relief valve (56) is a valve that discharges part of oil supplied to an oil passage communicating with the pump chamber (S3) into the case (18) when the pressure in this oil passage becomes abnormally high. As described above, in the vehicle drive device of Patent Document 1, the hydraulic pump (40) has a complicated configuration.

It is therefore desired to implement a vehicle drive device in which the configuration of a hydraulic pump can be simplified.

Means for Solving the Problem

In view of the above, a characteristic configuration of a vehicle control device is that the vehicle control device includes:

a rotating electrical machine that functions as a driving force source for a wheel;
an input member drivingly connected to the rotating electrical machine;
a pair of output members each drivingly connected to the wheel;
a differential gear mechanism that distributes rotation transmitted from the rotating electrical machine to the pair of output members;
a transmission gear mechanism that drivingly connects the input member and the differential gear mechanism;
a hydraulic pump that includes a pump rotor and a pump chamber housing the pump rotor and that supplies oil to at least the rotating electrical machine; and
a case that houses the rotating electrical machine, the input member, the differential gear mechanism, the transmission gear mechanism, and the hydraulic pump,
a direction along a rotation axis of the rotating electrical machine is an axial direction, the case includes a partition wall that separates in the axial direction a first housing chamber housing the rotating electrical machine and a second housing chamber housing the transmission gear mechanism and the differential gear mechanism, and
the pump chamber is formed in the partition wall so as to be located between the first housing chamber and the second housing chamber in the axial direction.

According to this characteristic configuration, the pump chamber of the hydraulic pump is formed in the partition wall that divides the internal space of the case into the first housing chamber and the second housing chamber. Therefore, even if oil leaks from the pump chamber, the oil only flows into the first housing chamber or the second housing chamber, and does not leak out of the case. According to this characteristic configuration, oil discharged from the hydraulic pump can thus be avoided from flowing out of the case without providing the hydraulic pump with a sealing member, a relief valve, etc. Accordingly, the configuration of the hydraulic pump can be simplified.

BRIEF DESCRIPTION OF THE DRAWINGS

FIG. 4 is a diagram showing the positional relationship of elements housed in a case in the vehicle drive device according to the embodiment as viewed in the axial direction.

MODES FOR CARRYING OUT THE DISCLOSURE

Figure 1:
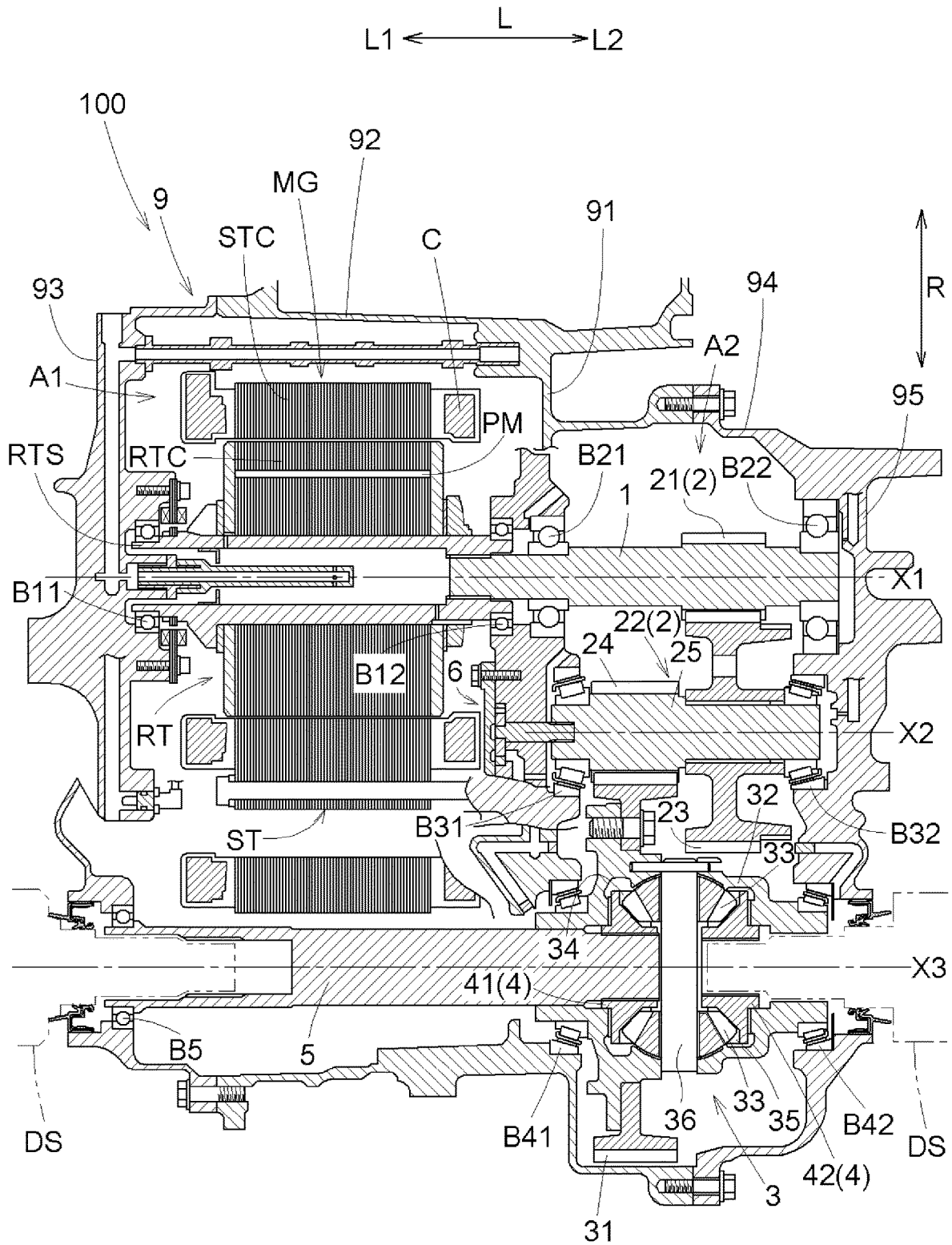
FIG. 1 is a sectional view taken along an axial direction of a vehicle drive device according to an embodiment.
Figure 2:
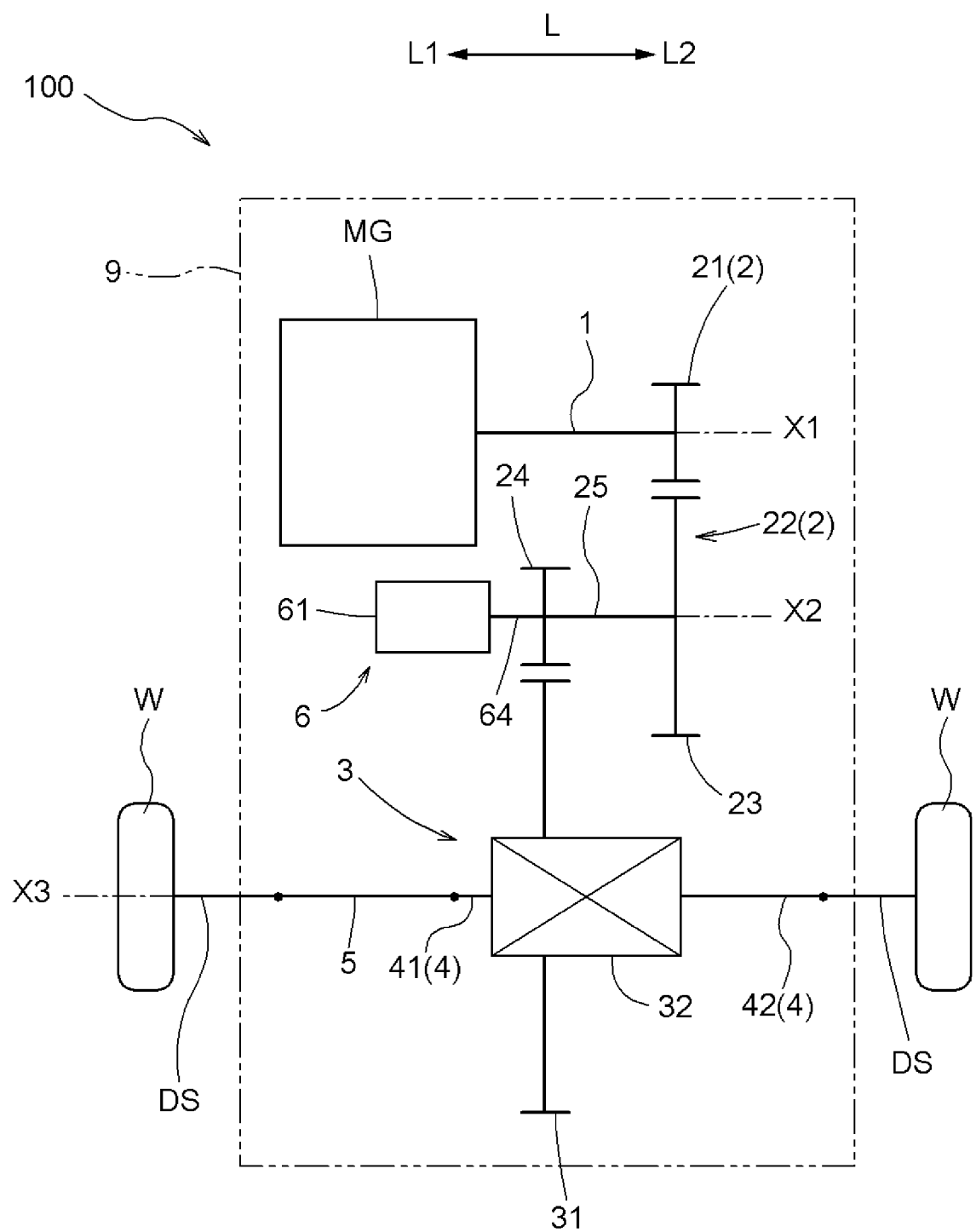
FIG. 2 is a skeleton diagram of the vehicle drive device according to the embodiment.

Hereinafter, a vehicle drive device 100 according to an embodiment will be described with reference to the drawings. As shown in FIGS. 1 and 2, the vehicle drive device 100 includes a rotating electrical machine MG, an input member 1, a transmission gear mechanism 2, a differential gear mechanism 3, a pair of output members 4, and a case 9.

In the following description, the direction along the rotation axis of the rotating electrical machine MG will be referred to as "axial direction L." One side in the axial direction L will be referred to as "first side L1 in the axial direction," and the other side in the axial direction L will be referred to as "second side L2 in the axial direction." The direction orthogonal to a rotation axis of a rotating member such as the rotating electrical machine MG will be referred to as "radial direction R" with respect to that rotation axis. When it is not necessary to distinguish with respect to which rotation axis the direction is, or when it is clear with respect to which rotation axis the direction is, the direction may be simply referred to as "radial direction R."

The case 9 houses the rotating electrical machine MG, the input member 1, the transmission gear mechanism 2, and the differential gear mechanism 3. In the present embodiment, the case 9 also houses the pair of output members 4.

As shown in FIG. 1, the case 9 includes a partition wall 91. The partition wall 91 is formed so as to partition the internal space of the case 9. Specifically, the partition wall 91 is formed so as to separate a first housing chamber A1 housing the rotating electrical machine MG and a second housing chamber A2 housing the transmission gear mechanism 2 and the differential gear mechanism 3 from each other in the axial direction L. In the present embodiment, the first housing chamber A1 houses a part of the input member 1 in addition to the rotating electrical machine MG. The second housing chamber A2 houses a part of the input member 1 and the pair of output members 4 in addition to the transmission gear mechanism 2 and the differential gear mechanism 3.

In the present embodiment, the case 9 further includes a first peripheral wall portion 92, a first side wall portion 93, a second peripheral wall portion 94, and a second side wall portion 95.

The first peripheral wall portion 92 is formed in a tubular shape having an axis in the axial direction L. The first side wall portion 93 is formed so as to close the opening on the first side L1 in the axial direction of the first peripheral wall portion 92. The second peripheral wall portion 94 is formed in a tubular shape having an axis in the axial direction L. The second side wall portion 95 is formed so as to close the opening on the second side L2 in the axial direction of the second peripheral wall portion 94. In the present embodiment, the partition wall 91 is formed so as to close the opening on the second side L2 in the axial direction of the first peripheral wall portion 92 and to close the opening on the first side L1 in the axial direction of the second peripheral wall portion 94. That is, the first peripheral wall portion 92 is formed so as to extend from the partition wall 91 toward the first side L1 in the axial direction, and the second peripheral wall portion 94 is formed so as to extend from the partition wall 91 toward the second side L2 in the axial direction. In the example shown in FIG. 1, the partition wall 91 is formed integrally with the first peripheral wall portion 92 and the second peripheral wall portion 94.

In the present embodiment, the space surrounded by the partition wall 91, the first peripheral wall portion 92, and the first side wall portion 93 inside the case 9 is formed as the first housing chamber A1. The space surrounded by the partition wall 91, the second peripheral wall portion 94, and the second side wall portion 95 inside the case 9 is formed as the second housing chamber A2.

The rotating electrical machine MG functions as a driving force source for wheels W. The rotating electrical machine MG has a function as a motor (electric motor) that is supplied with electric power to generate power, and a function as a generator (electric power generator) that is supplied with power to generate electric power. Specifically, the rotating electrical machine MG is electrically connected to an energy storage device such as a battery or a capacitor (not shown). The rotating electrical machine MG generates a driving force by power running with electric power stored in the energy storage device. The rotating electrical machine MG generates electric power with a driving force transmitted from the wheels W to charge the energy storage device.

The rotating electrical machine MG includes a stator ST and a rotor RT. The stator ST has a stator core STC fixed to a non-rotating member (in this example, the case 9). The rotor RT has a rotor core RTC supported rotatably with respect to the stator ST, and a rotor shaft RTS connected to the rotor core RTC so as to rotate with the rotor core RTC.

In the present embodiment, the rotating electrical machine MG is a rotating field rotating electrical machine. Therefore, a coil C is wound around the stator core STC such that coil end portions are formed that protrude from the stator core STC toward both sides in the axial direction L (first side L1 in the axial direction and second side L2 in the axial direction). Permanent magnets PM are provided in the rotor core RTC. In the present embodiment, the rotating electrical machine MG is an inner rotor rotating electrical machine. Therefore, the rotor core RTC is located inside the stator core STC in the radial direction R. The rotor core RTC supports the rotor shaft RTS from outside in the radial direction R.

The rotor shaft RTS is formed so as to extend in the axial direction L. In the present embodiment, the rotor shaft RTS is formed in a tubular shape having an axis in the axial direction L. The rotor shaft RTS is supported rotatably with respect to the case 9 by a first rotor bearing B11 and a second rotor bearing B12 disposed on the second side L2 in the axial direction with respect to the first rotor bearing B11. In the example shown in FIG. 1, the end portion on the first side L1 in the axial direction of the rotor shaft RTS is supported rotatably with respect to the first side wall portion 93 of the case 9 via the first rotor bearing B11. The end portion on the second side L2 in the axial direction of the rotor shaft RTS is supported rotatably with respect to the second side wall portion 95 of the case 9 via the second rotor bearing B12. In this example, the first rotor bearing B11 and the second rotor bearing B12 are ball bearings.

The input member 1 is drivingly connected to the rotating electrical machine MG. In the present embodiment, the input member 1 extends through the partition wall 91 of the case 9 in the axial direction L, and is disposed so as to extend in both the first housing chamber A1 and the second housing chamber A2. The input member 1 is disposed coaxially with the rotor shaft RTS of the rotating electrical machine MG, and is connected to the rotor shaft RTS in the first housing chamber A1 so as to rotate with the rotor shaft RTS. In the example shown in FIG. 1, a part of the input member 1 that is located on the first side L1 in the axial direction with respect to the partition wall 91 is located inside a part of the rotor shaft RTS that is located on the second side L2 in the axial direction with respect to the rotor core RTC in the radial direction R. These parts are connected to each other by spline engagement so as to rotate together.

In the present application, "drivingly connected" refers to a state in which two rotating elements are connected so that a driving force can be transmitted therebetween, and includes a state in which the two rotating elements are connected so as to rotate together or a state in which the two rotating elements are connected so that a driving force can be transmitted therebetween via one or two or more transmission members. Such transmission members include various members that transmit rotation at the same speed or at a shifted speed, such as a shaft, a gear mechanism, a belt, and a chain. The transmission members may include an engagement device that selectively transmits rotation and a driving force, such as a friction engagement device and a meshing engagement device. When "drivingly connected" is used for rotating elements in the differential gear mechanism 3, it refers to a state in which the rotating elements are drivingly connected to each other via no other rotating elements.

In the present embodiment, the input member 1 is supported rotatably with respect to the case 9 by a first input bearing B21 and a second input bearing B22 disposed on the second side L2 in the axial direction with respect to the first input bearing B21. In the example shown in FIG. 1, a part of the input member 1 that extends through the partition wall 91 of the case 9 is supported rotatably with respect to the partition wall 91 via the first input bearing B21. The end portion on the second side L2 in the axial direction of the input member 1 is supported rotatably with respect to the second side wall portion 95 of the case 9 via the second input bearing B22. In this example, the first input bearing B21 and the second input bearing B22 are ball bearings.

The transmission gear mechanism 2 drivingly connects the input member 1 and the differential gear mechanism 3. That is, the transmission gear mechanism 2 transmits rotation from the input member 1 to the differential gear mechanism 3. In the present embodiment, the transmission gear mechanism 2 includes a first gear 21 and a counter gear mechanism 22.

The first gear 21 is disposed on a first axis X1. Specifically, the first gear 21 is disposed so as to rotate about the first axis X1. The first axis X1 is the rotation axis of the input member 1. As described above, in the present embodiment, the input member 1 is disposed coaxially with the rotor shaft RTS of the rotating electrical machine MG. Therefore, the first axis X1 extends in the axial direction L that is the direction along the rotation axis of the rotating electrical machine MG.

The first gear 21 is connected to the input member 1 so as to rotate with the input member 1. In the example shown in FIG. 1, the first gear 21 is formed integrally with the input member 1. The first gear 21 is disposed between the first input bearing B21 and the second input bearing B22 in the axial direction L.

The counter gear mechanism 22 is disposed on a second axis X2 that is different from the first axis X1. The second axis X2 is the rotation axis of the counter gear mechanism 22. In the present embodiment, the second axis X2 extends parallel to the first axis X1. That is, in the present embodiment, the second axis X2 extends in the axial direction L.

The counter gear mechanism 22 includes a second gear 23 that meshes with the first gear 21, a third gear 24 that rotates with the second gear 23, and a counter shaft 25 that connects the second gear 23 and the third gear 24. The second gear 23, the third gear 24, and the counter shaft 25 are disposed on the second axis X2.

Each of the second gear 23 and the third gear 24 is connected to the counter shaft 25 so as to rotate with the counter shaft 25. In the example shown in FIG. 1, the second gear 23 is connected to the counter shaft 25 by spline engagement. The third gear 24 is formed integrally with the counter shaft 25. The third gear 24 is formed to have a smaller diameter than the second gear 23.

The counter shaft 25 is provided so as to extend in the second axis X2. In the present embodiment, the counter shaft 25 is supported rotatably with respect to the case 9 by a first counter bearing B31 and a second counter bearing B32 disposed on the second side L2 in the axial direction with respect to the first counter bearing B31. In the example shown in FIG. 1, the end portion on the first side 1 in the axial direction of the counter shaft 25 is supported rotatably with respect to the partition wall 91 of the case 9 via the first counter bearing B31. The end portion on the second side L2 in the axial direction of the counter shaft 25 is supported rotatably with respect to the second side wall portion 95 of the case 9 via the second counter bearing B32. In this example, the first counter bearing B31 and the second counter bearing B32 are tapered roller bearings.

The differential gear mechanism 3 is configured to distribute rotation transmitted from the rotating electrical machine MG to the pair of output members 4. In the present embodiment, the differential gear mechanism 3 includes a fourth gear 31 that meshes with the third gear 24 of the counter gear mechanism 22. Therefore, in the present embodiment, the differential gear mechanism 3 distributes rotation of the fourth gear 31 to the pair of output members 4.

The fourth gear 31 is disposed on a third axis X3 that is different from the first axis X1 and the second axis X2. The third axis X3 is the rotation axis of the fourth gear 31. In the present embodiment, the third axis X3 extends parallel to both the first axis X1 and the second axis X2. That is, in the present embodiment, the third axis X3 extends in the axial direction L.

In the present embodiment, the differential gear mechanism 3 further includes a differential case 32, a pair of pinion gears 33, and a first side gear 34 and a second side gear 35. In this example, the pair of pinion gears 33, the first side gear 34, and the second side gear 35 are all bevel gears.

The differential case 32 is a hollow member that houses the pair of pinion gears 33, the first side gear 34, and the second side gear 35. The differential case 32 is connected to the fourth gear 31 so as to rotate with the fourth gear 31. In the example shown in FIG. 1, the fourth gear 31 is connected to the differential case 32 using a bolt.

In the present embodiment, the differential case 32 is supported rotatably with respect to the case 9 by a first differential bearing B41 and a second differential bearing B42 disposed on the second side L2 in the axial direction with respect to the first differential bearing B41. In the illustrated example, the end portion on the first side L1 in the axial direction of the differential case 32 is supported rotatably with respect to the partition wall 91 of the case 9 via the first differential bearing B41. The end portion on the second side L2 in the axial direction of the differential case 32 is supported rotatably with respect to the second side wall portion 95 of the case 9 via the second differential bearing B42. In this example, the first differential bearing B41 and the second differential bearing B42 are tapered roller bearings.

The pair of pinion gears 33 is arranged so as to face each other at an interval in the radial direction R with respect to the third axis X3. The pair of pinion gears 33 is attached to a pinion shaft 36 supported so as to rotate with the differential case 32. The pair of pinion gears 33 is configured to rotate (rotate) about the pinion shaft 36 and to rotate (revolve) around the third axis X3.

The first side gear 34 and the second side gear 35 mesh with the pair of pinion gears 33. The first side gear 34 and the second side gear 35 are disposed so as to rotate about the third axis X3. The first side gear 34 and the second side gear 35 are arranged so as to face each other at an interval in the axial direction L and with the pinion shaft 36 interposed therebetween. The first side gear 34 is disposed on the first side L1 in the axial direction with respect to the second side gear 35.

The pair of output members 4 is each drivingly connected to the wheel W. In the present embodiment, the pair of output members 4 is arranged side by side on the third axis X3. In the following description, of the pair of output members 4, the output member 4 located on the first side L1 in the axial direction will be referred to as "first output member 41," and the output member 4 located on the second side L2 in the axial direction will be referred to as "second output member 42."

In the present embodiment, the second output member 42 is connected to the second side gear 35 so as to rotate with the second side gear 35. In the example shown in FIG. 1, the second output member 42 is formed integrally with the second side gear 35. In the present embodiment, the second output member 42 is connected to a drive shaft DS on the second side L2 in the axial direction so as to rotate with this drive shaft DS. In the example shown in FIG. 1, the second output member 42 is formed in a tubular shape having an axis in the axial direction L, and is located inside the second side gear 35 in the radial direction R. The drive shaft DS is inserted from the second side L2 in the axial direction so as to be located inside the second output member 42 in the radial direction R, and they are connected to each other by spline engagement.

In the present embodiment, the first output member 41 is connected to the first side gear 34 so as to rotate with the first side gear 34. In the example shown in FIG. 1, the first output member 41 is formed integrally with the first side gear 34. In the present embodiment, the first output member 41 is connected to a drive shaft DS on the first side L1 in the axial direction via a transmission shaft 5 so as to rotate with this drive shaft DS. In the example shown in FIG. 1, the first output member 41 is formed in a tubular shape having an axis in the axial direction L, and is located inside the first side gear 34 in the radial direction R. The transmission shaft 5 is inserted from the first side L1 in the axial direction so as to be located inside the first output member 41 in the radial direction R, and they are connected to each other by spline engagement.

The transmission shaft 5 is a shaft member that rotates about the third axis X3. In the present embodiment, the transmission shaft 5 extends through the partition wall 91 of the case 9 in the axial direction L, and is disposed so as to extend in both the first housing chamber A1 and the second housing chamber A2. The transmission shaft 5 is connected to the drive shaft DS on the first side L1 in the axial direction so as to rotate with this drive shaft DS. In the example shown in FIG. 1, a part of the transmission shaft 5 that extends from the end face on the first side L1 in the axial direction of the transmission shaft 5 to a position on the first side L1 in the axial direction with respect to the middle in the axial direction L of the transmission shaft 5 is formed in a tubular shape that opens toward the first side L1 in the axial direction. The first drive shaft DS1 is inserted from the first side L1 in the axial direction so as to be located inside the tubular part of the transmission shaft 5 in the radial direction R, and they are connected to each other by spline engagement.

In the present embodiment, the transmission shaft 5 is supported rotatably with respect to the case 9 by an output bearing B5. In the example shown in FIG. 1, the end portion on the first side L1 in the axial direction of the transmission shaft 5 is supported rotatably with respect to the first side wall portion 93 of the case 9 via the output bearing B5.

As shown in FIGS. 1 and 2, the vehicle drive device 100 includes a hydraulic pump 6. The hydraulic pump 6 is housed in the case 9. The hydraulic pump 6 is configured to supply oil to at least the rotating electrical machine MG. In the present embodiment, the hydraulic pump 6 supplies oil to the coil end portions of the coil C and the inner peripheral surface of the rotor shaft RTS in the rotating electrical machine MG. The hydraulic pump 6 also supplies oil to various bearings, gear meshing parts, etc. of the vehicle drive device 100. That is, in the present embodiment, oil discharged from the hydraulic pump 6 is used only to cool the rotating electrical machine MG and to lubricate the various bearings, gear meshing parts, etc.

Figure 3:
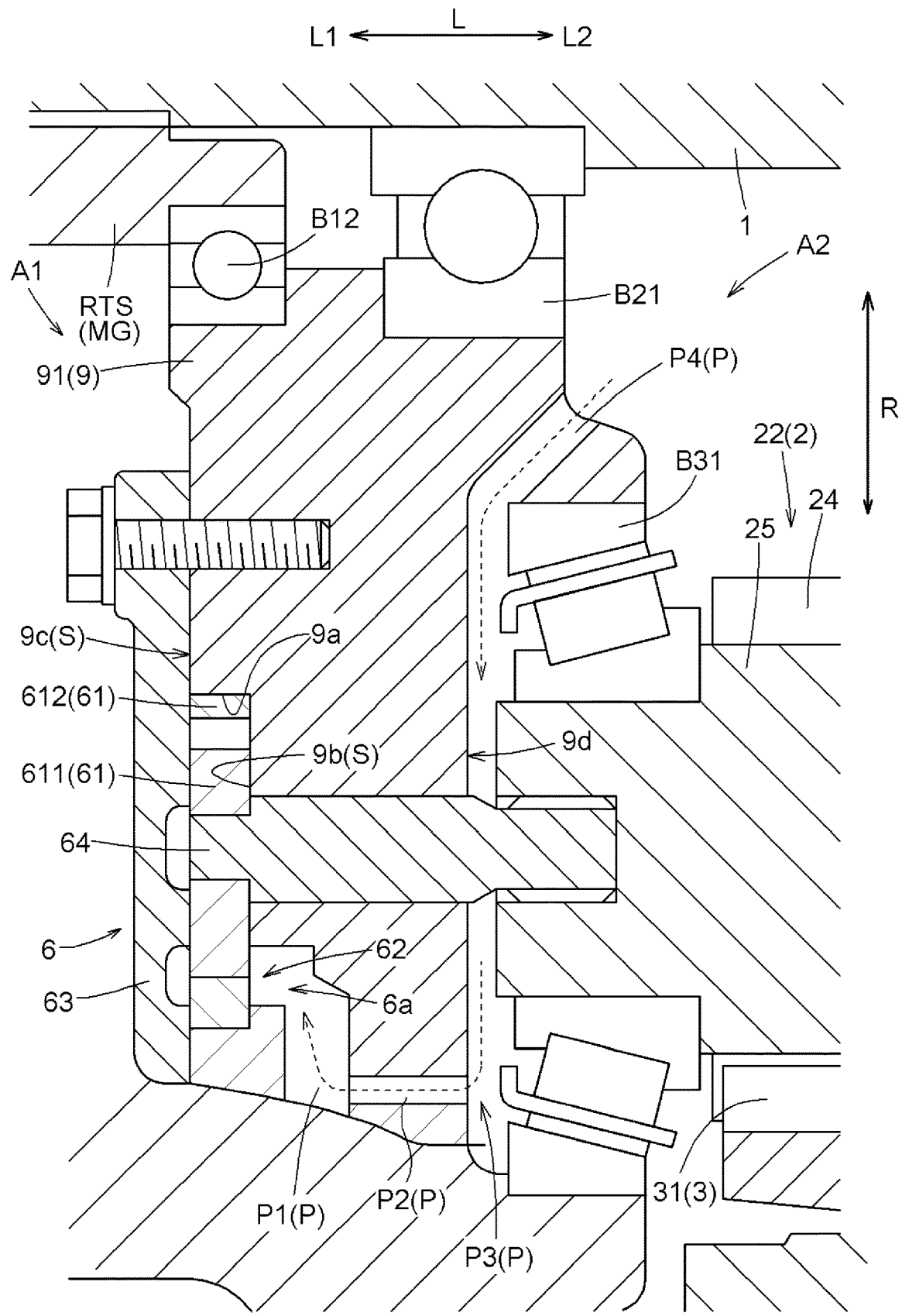
FIG. 3 is an enlarged view of a main part of the vehicle drive device according to the embodiment.

As shown in FIG. 3, the hydraulic pump 6 includes a pump rotor 61 and a pump chamber 62 housing the pump rotor 61. In the present embodiment, the hydraulic pump 6 further includes a pump cover 63 joined to the partition wall 91 of the case 9, and a pump input shaft 64 connected to the pump rotor 61 so as to rotate with the pump rotor 61.

In the present embodiment, the hydraulic pump 6 is an internal gear pump. Therefore, the pump rotor 61 includes an inner rotor 611 and an outer rotor 612 disposed outside the inner rotor 611 in the radial direction R. External teeth formed on the outer peripheral surface of the inner rotor 611 mesh with internal teeth formed on the inner peripheral surface of the outer rotor 612.

The pump chamber 62 is formed in the partition wall 91 of the case 9. The pump chamber 62 is located between the first housing chamber A1 and the second housing chamber A2 in the axial direction L. The pump chamber 62 is formed using a target surface S of the partition wall 91 of the case 9. The target surface S is a surface of the partition wall 91 that faces toward one side in the axial direction L. In the present embodiment, the target surface S is a surface of the partition wall 91 that faces toward the first housing chamber A1 (in this example, toward the first side L1 in the axial direction).

In the present embodiment, the pump chamber 62 is formed by a recess formed such that the target surface S of the partition wall 91 is recessed. Specifically, the pump chamber 62 is a space surrounded by a first inner surface 9a and a second inner surface 9b of the partition wall 91. The first inner surface 9a is formed in a cylindrical shape covering the outer peripheral surface of the outer rotor 612. The second inner surface 9b is formed in a planar shape covering the surfaces on the second side L2 in the axial direction of the inner rotor 611 and outer rotor 612. In the present embodiment, the first inner surface 9a is formed so as to extend from a first side surface 9c, namely the side surface on the first side L1 in the axial direction of the partition wall 91, toward the second side L2 in the axial direction. The second inner surface 9b is formed so as to extend inward in the radial direction R from the end on the second side L2 in the axial direction of the first inner surface 9a. In the present embodiment, the second inner surface 9b and the first side surface 9c correspond to the target surface S. In this example, the dimension in the axial direction L of the first inner surface 9a is slightly larger than the dimension in the axial direction L of the outer rotor 612.

The pump chamber 62 of the hydraulic pump 6 is thus formed in the partition wall 91 that divides the internal space of the case 9 into the first housing chamber A1 and the second housing chamber A2. Therefore, even if oil leaks from the pump chamber 62, the oil only flows into the first housing chamber A1 or the second housing chamber A2, and does not leak out of the case 9. According to this configuration, oil discharged from the hydraulic pump 6 can thus be avoided from flowing out of the case 9 without providing the hydraulic pump 6 with a sealing member, a relief valve, etc. Accordingly, the configuration of the hydraulic pump 6 can be simplified.

As described above, in the present embodiment, oil discharged from the hydraulic pump 6 is used only to cool the rotating electrical machine MG and to lubricate the various bearings, gear meshing parts, etc. In the case where oil discharged from the hydraulic pump 6 is used to control an engagement device, a hydraulic pressure for controlling the engagement device may not be able to be properly supplied if the hydraulic pump 6 is not provided with such a sealing member, relief valve, etc. as described above. In the present embodiment, however, oil discharged from the hydraulic pump 6 is not used to control an engagement device. Therefore, even if oil leaks from the pump chamber 62, it will not affect traveling of the vehicle.

In the present embodiment, a discharge port 6a and suction port (not shown) of the hydraulic pump 6 are formed to open to the second inner surface 9b. The discharge port 6a is a port through which the pump rotor 61 discharges oil out of the pump chamber 62, and is connected to a discharge oil passage (in this example, a first oil passage P1 that will be described later). The suction port is a port through which the pump rotor 61 sucks oil from outside the pump chamber 62, and is connected to a suction oil passage.

The pump cover 63 is joined to the partition wall 91 so as to face the target surface S in the axial direction L. The pump chamber 62 is formed between the pump cover 63 and the pump cover 63 in the axial direction L. In the present embodiment, the pump cover 63 is joined to the partition wall 91 from the first side L1 in the axial direction so as to cover the pump rotor 61 housed in the pump chamber 62 formed by the first inner surface 9a and second inner surface 9b of the partition wall 91.

As described above, in the present embodiment, the hydraulic pump 6 further includes the pump cover 63 joined to the partition wall 91, and the pump chamber 62 is formed between the partition wall 91 and the pump cover 63 in the axial direction L.

According to this configuration, by joining the pump cover 63 to the partition wall 91 of the case 9, the pump chamber 62 can be appropriately formed using a part of the partition wall 91. The amount of oil that leaks from the pump chamber 62 can thus be reduced. Accordingly, the configuration of the hydraulic pump 6 can further be simplified while avoiding oil discharged from the hydraulic pump 6 from flowing out of the case 9.

The pump input shaft 64 is an input element of the hydraulic pump 6. In the present embodiment, the pump input shaft 64 is disposed so as to extend through the partition wall 91 in the axial direction L. That is, in the present embodiment, the pump input shaft 64 is disposed so as to extend from the first housing chamber A1 into the second housing chamber A2. In the present embodiment, the pump input shaft 64 is drivingly connected to a shaft of the transmission gear mechanism 2 in the second housing chamber A2. The pump input shaft 64 is disposed on the second axis X2, and is connected to the counter shaft 25 so as to rotate with the counter shaft 25. In the illustrated example, a part of the pump input shaft 64 that protrudes from the partition wall 91 toward the second side L2 in the axial direction is inserted into an opening portion formed so as to be recessed from the end face on the first side L1 in the axial direction of the counter shaft 25 toward the second side L2 in the axial direction. They are connected to each other by spline engagement.

As described above, in the present embodiment, the hydraulic pump 6 further includes the pump input shaft 64 connected to the pump rotor 61 so as to rotate with the pump rotor 61, and the pump input shaft 64 is disposed so as to extend through the partition wall 91 in the axial direction L, and is drivingly connected to the shaft of the transmission gear mechanism 2 in the second housing chamber A2.

According to this configuration, the pump input shaft 64 can be supported rotatably with respect to the partition wall 91 of the case 9, and the pump rotor 61 can be appropriately rotated and driven by using rotation of the transmission gear mechanism 2.

In the present embodiment, the transmission gear mechanism 2 includes: the first gear 21 disposed on the first axis X1 that is the rotation axis of the input member 1 and connected to the input member 1 so as to rotate with the input member 1; and the counter gear mechanism 22 disposed on the second axis X2 different from the first axis X1, the counter gear mechanism 22 includes the second gear 23 that meshes with the first gear 21, the third gear 24 that rotates with the second gear 23, and the counter shaft 25 that connects the second gear 23 and the third gear 24, the differential gear mechanism 3 includes the fourth gear 31 that is disposed on the third axis X3 different from the first axis X1 and the second axis X2 and that meshes with the third gear 24, the hydraulic pump 6 further includes the pump input shaft 64 connected to the pump rotor 61 so as to rotate with the pump rotor 61, and the pump input shaft 64 is disposed on the second axis X2, and is connected to the counter shaft 25 so as to rotate with the counter shaft 25.

In such a configuration, the rotational speed of the counter gear mechanism 22 is typically lower than the rotational speed of the rotating electrical machine MG. Therefore, according to the configuration in which the hydraulic pump 6 is driven by rotation of the counter shaft 25 as described above, the rotational speed of the pump rotor 61 can be reduced as compared to the configuration in which the hydraulic pump 6 is driven by the rotating electrical machine MG. Accordingly, energy loss due to high-speed rotation of the hydraulic pump 6 can be reduced, and therefore, energy efficiency of the vehicle drive device 100 can be increased.

In the present embodiment, the first oil passage P1 described above, a second oil passage P2, a third oil passage P3, and a fourth oil passage P4 are formed in the partition wall 91 of the case 9.

The first oil passage P1 is formed inside the partition wall 91 so as to communicate with the pump chamber 62. The second oil passage P2 is formed so as to cause the first oil passage P1 and the third oil passage P3 to communicate with each other. In the present embodiment, the second oil passage P2 is formed so as to extend in the axial direction L from the first oil passage P1 to a second side surface 9d that is a side surface on the second side L2 in the axial direction of the partition wall 91. The third oil passage P3 is formed so as to cause the second oil passage P2 and the fourth oil passage P4 to communicate with each other. In the present embodiment, the third oil passage P3 is formed between the second side surface 9d of the partition wall 91 and the first counter bearing B31 and the counter shaft 25 in the axial direction L. The fourth oil passage P4 is formed so as to cause the third oil passage P3 and the second housing chamber A2 to communicate with each other. In the present embodiment, the fourth oil passage P4 is formed in a tubular part of the partition wall 91 that supports the first counter bearing B31, so as to open to the second housing chamber A2.

The flow of oil when a vehicle equipped with the vehicle drive device 100 of the present embodiment moves forward will be described. In the present embodiment, when the vehicle moves forward, the pump rotor 61 rotates in the forward rotation direction (rotation direction when the vehicle moves forward) as the hydraulic pump 6 is driven with rotation of the counter shaft 25. Oil is thus sucked from a storage portion provided in the case 9 into the pump chamber 62 through the suction oil passage (not shown) and the suction port described above, and is discharged through the discharge port 6a into the first oil passage P1. Part of the oil discharged into the first oil passage P1 flows through the second oil passage P2 into the third oil passage P3. The oil that has flowed into the third oil passage P3 lubricates the first counter bearing B31 that forms the third oil passage P3, and then returns to the storage portion while lubricating other elements. As described above, when the vehicle moves forward, oil is supplied to the pump chamber 62, and therefore, the pump rotor 61 is always lubricated.

The flow of oil when the vehicle equipped with the vehicle drive device 100 of the present embodiment moves backward will be described. When the vehicle moves backward, the pump rotor 61 rotates in the reverse rotation direction (opposite direction to the forward rotation direction described above), and therefore, the oil flow formed by the hydraulic pump 6 is reversed. Accordingly, oil is not sucked from the storage portion provided in the case 9 into the pump chamber 62. In the present embodiment, however, the fourth gear 31 of the differential gear mechanism 3 is disposed so as to scoop up oil stored inside the case 9. At least when the pump rotor 61 rotates in the reverse rotation direction, oil scooped up by the fourth gear 31 is supplied into the third oil passage P3 through the fourth oil passage P4 that opens to the second housing chamber A2. Specifically, the opening of the fourth oil passage P4 is located in the passage through which oil scooped up by the fourth gear 31 flows. The oil thus supplied into the third oil passage P3 through the fourth oil passage P4 is sucked into the pump chamber 62 through the second oil passage P2 and the first oil passage P1 (see dashed arrows in FIG. 3) as the pump rotor 61 rotates in the reverse rotation direction (rotation direction when the vehicle moves forward). As described above, when the vehicle moves backward, oil is supplied to the pump chamber 62, and therefore, the pump rotor 61 is always lubricated. In the present embodiment, in order to make it easier to supply oil scooped up by the fourth gear 31 into the fourth oil passage P4, the fourth oil passage P4 opens at least upward in the second housing chamber A2. In the example shown in FIG. 3, the fourth oil passage P4 opens upward toward the second side L2 in the axial direction in the second housing chamber A2.

As described above, when the vehicle equipped with the vehicle drive device 100 of the present embodiment moves forward, oil is sucked from the storage portion provided in the case 9 into the pump chamber 62, and therefore, the pump rotor 61 is lubricated. Even when the vehicle equipped with the vehicle drive device 100 of the present embodiment moves backward, oil scooped up by the fourth gear 31 is supplied into the pump chamber 62 sequentially through the fourth oil passage P4, the third oil passage P3, the second oil passage P2, and the first oil passage P1, and therefore, the pump rotor 61 is lubricated. In the present embodiment, the pump rotor 61 can thus be appropriately lubricated regardless of the traveling state of the vehicle equipped with the vehicle drive device 100. In the present embodiment, the first oil passage P1, the second oil passage P2, the third oil passage P3, and the fourth oil passage P4 function as a "supply oil passage P" through which oil scooped up by the fourth gear 31 is supplied into the pump chamber 62.

As described above, in the present embodiment, the fourth gear 31 is disposed so as to scoop up oil stored inside the case 9, the rotation direction of the pump rotor 61 when the hydraulic pump 6 supplies oil to the rotating electrical machine MG is the forward rotation direction, and the opposite direction to the forward rotation direction is the reverse rotation direction, and the vehicle drive device 100 includes the supply oil passage P through which oil scooped up by the fourth gear 31 is supplied into the pump chamber 62 at least when the pump rotor 61 rotates in the reverse rotation direction.

According to this configuration, when the pump rotor 61 rotates in the reverse rotation direction, that is, when the vehicle equipped with the vehicle drive device 100 moves backward, oil scooped up by the fourth gear 31 is supplied into the pump chamber 62 through the supply oil passage P. When the pump rotor 61 rotates in the forward rotation direction, that is, when the vehicle equipped with the vehicle drive device 100 moves forward, oil stored inside the case 9 is sucked and supplied into the pump chamber 62 with the rotation of the pump rotor 61. Therefore, according to this configuration, the pump rotor 61 can be appropriately lubricated regardless of the traveling state of the vehicle equipped with the vehicle drive device 100.

Hereinafter, the positional relationship of the elements housed in the case 9 as viewed in the axial direction L will be described. The sign "V" in FIG. 4 indicates the vertical direction of the vehicle drive device 100 mounted on the vehicle.

As shown in FIG. 4, in the present embodiment, the second axis X2 is located above both the first axis X1 and the third axis X3. In this example, the first axis X1 is located above the third axis X3, and the second axis X2 is located above the first axis X1.

Other Embodiments (1) In the above embodiment, the configuration in which the pump chamber 62 is formed by a recess formed such that the target surface S of the partition wall 91 is recessed is described as an example. However, the present disclosure is not limited to such a configuration. The pump chamber 62 may be formed by both a recess formed such that the target surface S of the partition wall 91 is recessed and a recess formed such that the surface of the pump cover 63 that faces the target surface S is recessed. Alternatively, the recess may not be formed in the partition wall 91, and the pump chamber 62 may be formed by a recess formed such that the surface of the pump cover 63 that faces the target surface S is recessed.

(2) In the above embodiment, the configuration in which the transmission gear mechanism 2 includes the counter gear mechanism 22 and the pump input shaft 64 is connected to the counter shaft 25 of the counter gear mechanism 22 so as to rotate with the counter shaft 25 is described as an example. However, the present disclosure is not limited to such a configuration. For example, when the transmission gear mechanism 2 includes a plurality of shafts, the pump input shaft 64 need only be connected to one of the plurality of shafts so as to rotate with this shaft. The pump input shaft 64 may not be connected to a shaft of the transmission gear mechanism 2, and may be connected to, for example, the input member 1 so as to rotate with the input member 1.

(3) In the above embodiment, the configuration in which the target surface S is a surface of the partition wall 91 that faces toward the first housing chamber A1 and the pump input shaft 64 is disposed so as to extend through the partition wall 91 in the axial direction L is described as an example. However, the present disclosure is not limited to such a configuration. The target surface S may be a surface of the partition wall 91 that faces toward the second housing chamber A2, and the pump input shaft 64 may be disposed so as not to extend through the partition wall 91 in the axial direction L.

(4) In the above embodiment, the configuration in which the second axis X2 is located above both the first axis X1 and the third axis X3 is described as an example. However, the present disclosure is not limited to such a configuration. The second axis X2 may be located below either or both of the first axis X1 and the third axis X3.

(5) In the above embodiment, the configuration in which the partition wall 91 is formed integrally with the first peripheral wall portion 92 and the second peripheral wall portion 94 is described as an example. However, the present disclosure is not limited to such a configuration. The partition wall 91 may be formed by a separate member from the first peripheral wall portion 92 and the second peripheral wall portion 94 and may be fixed to these by fixing members such as bolts. In the above embodiment, the configuration in which the first peripheral wall portion 92 and the second peripheral wall portion 94 are formed integrally is described as an example. However, the present disclosure is not limited to such a configuration. The first peripheral wall portion 92 and the second peripheral wall portion 94 may be formed by separate members. In this case, the partition wall 91 may be formed integrally with either the first peripheral wall portion 92 or the second peripheral wall portion 94, or may be formed by a separate member from these.

(6) The configuration disclosed in each of the above embodiments can be applied in combination with the configurations disclosed in the other embodiments as long as no contradiction arises. Regarding the other configurations as well, the embodiments disclosed herein are merely illustrative in all respects. Therefore, various modifications can be made as appropriate without departing from the spirit and scope of the present disclosure.

Outline of Embodiment Described Above

Hereinafter, the outline of the vehicle drive device (100) described above will be provided.

A vehicle drive device (100) includes:
- a rotating electrical machine (MG) that functions as a driving force source for a wheel (W);
- an input member (1) drivingly connected to the rotating electrical machine (MG);
- a pair of output members (4) each drivingly connected to the wheel (W);
- a differential gear mechanism (3) that distributes rotation transmitted from the rotating electrical machine (MG) to the pair of output members (4);
- a transmission gear mechanism (2) that drivingly connects the input member (1) and the differential gear mechanism (3);
- a hydraulic pump (6) that includes a pump rotor (61) and a pump chamber (62) housing the pump rotor (61) and that supplies oil to at least the rotating electrical machine (MG); and
- a case (9) that houses the rotating electrical machine (MG), the input member (1), the differential gear mechanism (3), the transmission gear mechanism (2), and the hydraulic pump (6),
- a direction along a rotation axis of the rotating electrical machine (MG) is an axial direction (L),
- the case (9) includes a partition wall (91) that separates in the axial direction (L) a first housing chamber (A1) housing the rotating electrical machine (MG) and a second housing chamber (A2) housing the transmission gear mechanism (2) and the differential gear mechanism (3), and
- the pump chamber (62) is formed in the partition wall (91) so as to be located between the first housing chamber (A1) and the second housing chamber (A2) in the axial direction (L).

According to this configuration, the pump chamber (62) of the hydraulic pump (6) is formed in the partition wall (91) that divides the internal space of the case (9) into the first housing chamber (A1) and the second housing chamber (A2). Therefore, even if oil leaks from the pump chamber (62), the oil only flows into the first housing chamber (A1) or the second housing chamber (A2), and does not leak out of the case (9). According to this configuration, oil discharged from the hydraulic pump (6) can thus be avoided from flowing out of the case (9) without providing the hydraulic pump (6) with a sealing member, a relief valve, etc. Accordingly, the configuration of the hydraulic pump (6) can be simplified.

It is suitable that the hydraulic pump (6) further include a pump cover (63) joined to the partition wall (91), and
the pump chamber (62) be formed between the partition wall (91) and the pump cover (63) in the axial direction (L).

According to this configuration, by joining the pump cover (63) to the partition wall (91) of the case (9), the pump chamber (62) can be appropriately formed using a part of the partition wall (91). The amount of oil that leaks from the pump chamber (62) can thus be reduced. Accordingly, the configuration of the hydraulic pump (6) can further be simplified while avoiding oil discharged from the hydraulic pump (6) from flowing out of the case (9).

It is suitable that the hydraulic pump (6) further include a pump input shaft (64) connected to the pump rotor (61) such that the pump input shaft (64) rotates with the pump rotor (61), and
the pump input shaft (64) be disposed so as to extend through the partition wall (91) in the axial direction (L), and be drivingly connected to a shaft of the transmission gear mechanism (2) in the second housing chamber (A2).

According to this configuration, the pump input shaft (64) can be supported rotatably with respect to the partition wall (91) of the case (9), and the pump rotor (61) can be appropriately rotated and driven by using rotation of the transmission gear mechanism (2).

It is suitable that the transmission gear mechanism (2) include: a first gear (21) disposed on a first axis (X1) that is a rotation axis of the input member (1) and connected to the input member (1) such that the first gear (21) rotates with the input member (1); and a counter gear mechanism (22) disposed on a second axis (X2) different from the first axis (X1), the counter gear mechanism (22) include a second gear (23) that meshes with the first gear (21), a third gear (24) that rotates with the second gear (23), and a counter shaft (25) that connects the second gear (23) and the third gear (24), the differential gear mechanism (3) include a fourth gear (31) disposed on a third axis (X3) different from the first axis (X1) and the second axis (X2) and meshing with the third gear (24), the hydraulic pump (6) further include a pump input shaft (64) connected to the pump rotor (61) such that the pump input shaft (64) rotates with the pump rotor (61), and the pump input shaft (64) be disposed on the second axis (X2) and be connected to the counter shaft (25) so as to rotate with the counter shaft (25).

In such a configuration, a rotational speed of the counter gear mechanism (22) is typically lower than a rotational speed of the rotating electrical machine (MG). Therefore, according to the configuration in which the hydraulic pump (6) is driven by rotation of the counter shaft (25) as described above, a rotational speed of the pump rotor (61) can be reduced as compared to a configuration in which the hydraulic pump (6) is driven by the rotating electrical machine (MG). Accordingly, energy loss due to high-speed rotation of the hydraulic pump (6) can be reduced, and therefore, energy efficiency of the vehicle drive device (100) can be increased.

In the configuration in which the transmission gear mechanism (2) includes the first gear (21) and the counter gear mechanism (22), it is suitable that the fourth gear (31) be disposed so as to scoop up oil stored inside the case (9), a rotation direction of the pump rotor (61) when the hydraulic pump (6) supplies the oil to the rotating electrical machine (MG) be a forward rotation direction, and an opposite direction to the forward rotation direction be a reverse rotation direction, and the vehicle drive device further include a supply oil passage (P) through which the oil scooped up by the fourth gear (31) is supplied into the pump chamber (62) at least when the pump rotor (61) rotates in the reverse rotation direction.

According to this configuration, when the pump rotor (61) rotates in the reverse rotation direction, that is, when a vehicle equipped with the vehicle drive device (100) moves backward, oil scooped up by the fourth gear (31) is supplied into the pump chamber (62) through the supply oil passage (P). When the pump rotor (61) rotates in the forward rotation direction, that is, when the vehicle equipped with the vehicle drive device (100) moves forward, oil stored inside the case (9) is sucked and supplied into the pump chamber (62) with the rotation of the pump rotor (61). Therefore, according to this configuration, the pump rotor (61) can be appropriately lubricated regardless of the traveling state of the vehicle equipped with the vehicle drive device (100).

INDUSTRIAL APPLICABILITY

The technique according to the present disclosure is applicable to vehicle drive devices including: a rotating electrical machine that functions as a driving force source for wheels; an input member drivingly connected to the rotating electrical machine; a pair of output members each drivingly connected to the wheel; a differential gear mechanism that distributes rotation transmitted from the rotating electrical machine to the pair of output members; and a hydraulic pump that supplies oil to at least the rotating electrical machine.

DESCRIPTION OF THE REFERENCE NUMERALS

100: vehicle drive device, 1: input member, 2: transmission gear mechanism, 3: differential gear mechanism, 4: output member, 6: hydraulic pump, 61: pump rotor, 62: pump chamber, 9: case, 91: partition wall, A1: first housing chamber, A2: second housing chamber, MG: rotating electrical machine, W: wheel, L: axial direction

The invention claimed is:

1. A vehicle drive device comprising:
a rotating electrical machine that functions as a driving force source for a wheel;
an input member drivingly connected to the rotating electrical machine;
a pair of output members each drivingly connected to the wheel;
a differential gear mechanism that distributes rotation transmitted from the rotating electrical machine to the pair of output members;
a transmission gear mechanism that drivingly connects the input member and the differential gear mechanism;
a hydraulic pump that includes a pump rotor and a pump chamber housing the pump rotor and that supplies oil to the rotating electrical machine, bearings, or gear meshing parts; and
a case that houses the rotating electrical machine, the input member, the differential gear mechanism, the transmission gear mechanism, and the hydraulic pump, wherein:
a direction along a rotation axis of the rotating electrical machine is an axial direction,
the case includes a partition wall that separates in the axial direction a first housing chamber housing the rotating electrical machine and a second housing chamber housing the transmission gear mechanism and the differential gear mechanism,
the pump chamber is formed in the partition wall so as to be located between the first housing chamber and the second housing chamber in the axial direction,
the hydraulic pump further includes a pump input shaft connected to the pump rotor such that the pump input shaft rotates with the pump rotor, and
the pump input shaft is disposed so as to extend through the partition wall in the axial direction, and is drivingly connected to a shaft of the transmission gear mechanism in the second housing chamber.

2. The vehicle drive device according to claim 1, wherein the hydraulic pump further includes a pump cover joined to the partition wall, and
the pump chamber is formed between the partition wall and the pump cover in the axial direction.

3. A vehicle drive device comprising:
a rotating electrical machine that functions as a driving force source for a wheel;
an input member drivingly connected to the rotating electrical machine;
a pair of output members each drivingly connected to the wheel;
a differential gear mechanism that distributes rotation transmitted from the rotating electrical machine to the pair of output members;

a transmission gear mechanism that drivingly connects the input member and the differential gear mechanism;
a hydraulic pump that includes a pump rotor and a pump chamber housing the pump rotor and that supplies oil to the rotating electrical machine, bearings, or gear meshing parts; and
a case that houses the rotating electrical machine, the input member, the differential gear mechanism, the transmission gear mechanism, and the hydraulic pump, wherein:
a direction along a rotation axis of the rotating electrical machine is an axial direction,
the case includes a partition wall that separates in the axial direction a first housing chamber housing the rotating electrical machine and a second housing chamber housing the transmission gear mechanism and the differential gear mechanism,
the pump chamber is formed in the partition wall so as to be located between the first housing chamber and the second housing chamber in the axial direction,
the transmission gear mechanism includes a first gear disposed on a first axis that is a rotation axis of the input member and connected to the input member such that the first gear rotates with the input member, and a counter gear mechanism disposed on a second axis different from the first axis,
the counter gear mechanism includes a second gear that meshes with the first gear, a third gear that rotates with the second gear, and a counter shaft that connects the second gear and the third gear,
the differential gear mechanism includes a fourth gear disposed on a third axis different from the first axis and the second axis and meshing with the third gear,
the hydraulic pump further includes a pump input shaft connected to the pump rotor such that the pump input shaft rotates with the pump rotor, and
the pump input shaft is disposed on the second axis and is connected to the counter shaft so as to rotate with the counter shaft.

4. The vehicle drive device according to claim 3, wherein the fourth gear is disposed so as to scoop up oil stored inside the case,
a rotation direction of the pump rotor when the hydraulic pump supplies the oil to the rotating electrical machine is a forward rotation direction, and an opposite direction to the forward rotation direction is a reverse rotation direction, and
the vehicle drive device further includes a supply oil passage through which the oil scooped up by the fourth gear is supplied into the pump chamber at least when the pump rotor rotates in the reverse rotation direction.

5. The vehicle drive device according to claim 2, wherein the transmission gear mechanism includes a first gear disposed on a first axis that is a rotation axis of the input member and connected to the input member such that the first gear rotates with the input member, and a counter gear mechanism disposed on a second axis different from the first axis,
the counter gear mechanism includes a second gear that meshes with the first gear, a third gear that rotates with the second gear, and a counter shaft that connects the second gear and the third gear,
the differential gear mechanism includes a fourth gear disposed on a third axis different from the first axis and the second axis and meshing with the third gear, and
the pump input shaft is disposed on the second axis and is connected to the counter shaft so as to rotate with the counter shaft.

6. The vehicle drive device according to claim 1, wherein the transmission gear mechanism includes a first gear disposed on a first axis that is a rotation axis of the input member and connected to the input member such that the first gear rotates with the input member, and a counter gear mechanism disposed on a second axis different from the first axis,
the counter gear mechanism includes a second gear that meshes with the first gear, a third gear that rotates with the second gear, and a counter shaft that connects the second gear and the third gear,
the differential gear mechanism includes a fourth gear disposed on a third axis different from the first axis and the second axis and meshing with the third gear, and
the pump input shaft is disposed on the second axis and is connected to the counter shaft so as to rotate with the counter shaft.

7. The vehicle drive device according to claim 5, wherein the fourth gear is disposed so as to scoop up oil stored inside the case,
a rotation direction of the pump rotor when the hydraulic pump supplies the oil to the rotating electrical machine is a forward rotation direction, and an opposite direction to the forward rotation direction is a reverse rotation direction, and
the vehicle drive device further includes a supply oil passage through which the oil scooped up by the fourth gear is supplied into the pump chamber at least when the pump rotor rotates in the reverse rotation direction.

8. The vehicle drive device according to claim 6, wherein the fourth gear is disposed so as to scoop up oil stored inside the case,
a rotation direction of the pump rotor when the hydraulic pump supplies the oil to the rotating electrical machine is a forward rotation direction, and an opposite direction to the forward rotation direction is a reverse rotation direction, and
the vehicle drive device further includes a supply oil passage through which the oil scooped up by the fourth gear is supplied into the pump chamber at least when the pump rotor rotates in the reverse rotation direction.

* * * * *